Patented Dec. 4, 1934

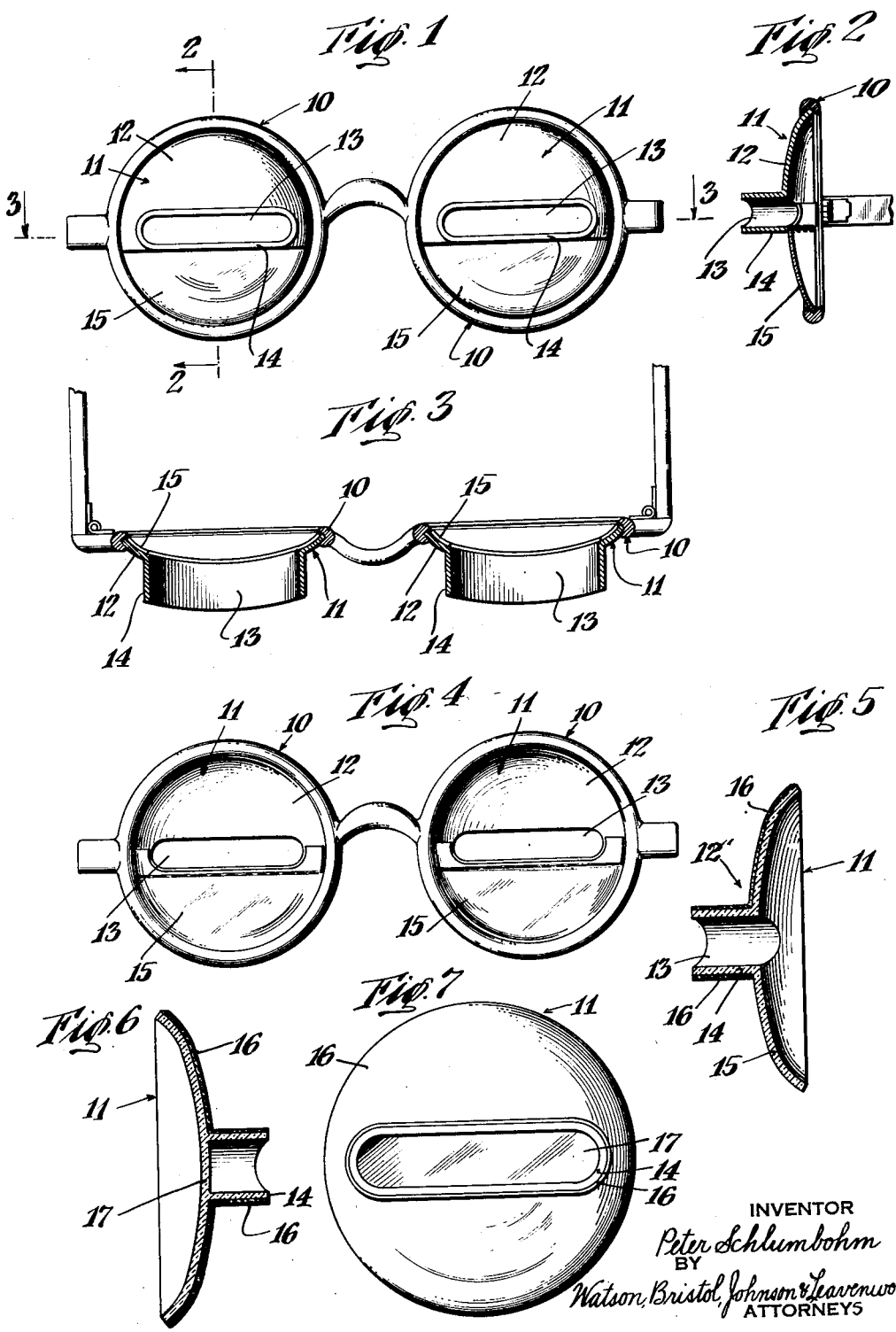
Dec. 4, 1934. P. SCHLUMBOHM 1,983,312
OPTICAL DEVICE
Filed Oct. 25, 1933

1,983,312

UNITED STATES PATENT OFFICE 1,983,312

OPTICAL DEVICE

Peter Schlumbohm, New York, N. Y., assignor to Centa Trading Corporation, New York, N. Y., a corporation of New York Application October 25, 1933, Serial No. 695,082

6 Claims. (Cl. 2—14)

The present invention relates to optical devices for shielding the eyes from excessive light and is preferably embodied in the form of spectacles of the type shown in my copending application Serial No. 634,744 filed September 24, 1932, of which this is a continuation in part.

A general object of the invention is the provision of such a device which efficiently increases the sight capacity of the human eye in cases where objects to be focused are surrounded by other objects which are highly illuminated.

A more specific object of the invention is the provision of such a device comprising a diaphragm over each eye, each diaphragm consisting of a major portion including the upper half of the diaphragm, and a minor portion, the major portion being provided with a horizontal slot disposed on the level of the center of rotation of the eye and with a forwardly projecting tube in registry with the slot, the height of the slot and corresponding diameter of the inside of the tube being larger than the normal diameter of the pupil of the eye and the lateral length of the slot and corresponding diameter of the inside of the tube being sufficient to give lateral vision, the forward length of the tube being sufficient to augment the subjective intensity of a viewed object by creating a field stop, with at least the major portion including the tube being opaqued to screen out light rays.

Another object of the invention is the provision of such a device wherein the major portion of the diaphragm including the upper half thereof, the slot and forwardly projecting tube associated therewith are opaqued to screen out light rays and the remaining minor portion is of transparent material to provide a limited field of vision below the field of vision provided by the slot.

Other objects of the invention will in part be obvious and will in part appear hereinafter.

The invention accordingly comprises an article of manufacture possessing the features, properties, and the relation of elements which will be exemplified in the article hereinafter described and the scope of the invention of which will be indicated in the claims.

For a fuller understanding of the nature and objects of the invention reference should be had to the following detailed description taken in connection with the accompanying drawing in which:

Fig. 1 is a front elevational view of a pair of spectacles provided with diaphragms incorporating the principles of the present invention;

Fig. 2 is a sectional view on line 2—2 of Fig. 1;

Fig. 3 is a sectional view on line 3—3 of Fig. 1;

Fig. 4 is a rear elevational view of the device depicted in Fig. 1;

Fig. 5 is a sectional view of a modified form of the diaphragm depicted in Figs. 1, 2, 3 and 4;

Fig. 6 is a sectional view of a further modified form of diaphragm; and

Fig. 7 is a front elevational view of the diaphragm depicted in Fig. 6.

The objective light-value depends upon the intensity of the source of the primary light and, of course, can be augmented only by using a stronger source of primary light. The subjective light-value, however, can be increased without using a stronger source of primary light since it depends upon the circumstances under which the object is viewed. Light coming from objects surrounding the objects to be focused reduces the sensibility of the human eye with regard to the rays coming from the object to be focused.

The device of the present invention allows the human eye fully to receive all of the light which comes from the objects to be focused while the light coming from surrounding objects is partially or wholly screened off without reducing the quantity of light directed into the human eye from the objects to be focused.

This is accomplished by providing a diaphragm over each eye which has a horizontal slot disposed on the level of the center of rotation of the eye, having a vertical diameter larger than the normal diameter of the pupil of the eye, that is, a vertical diameter between about 5 and 10 millimeters, the diameter of a normal pupil of an eye in light of medium intensity being about 4 millimeters. The lateral length of the slot is sufficient to give lateral vision. A forwardly projecting tube is provided on the diaphragm in registry with the slot, the forward length of the tube being sufficient to augment the subjective intensity of a viewed object by creating a field stop, preferably of a length about equal to the vertical diameter of the slot. At least the major portion of the diaphragm, including the upper half thereof, the horizontal slot and the forwardly projecting tube associated therewith are opaqued or formed from opaque material to screen out light rays including those which may be generally termed as "sky rays". The lower minor portion of the diaphragm in accordance with one modification is formed from transparent material having glare reducing properties to screen out some of the "ground rays" to reduce glare while permitting a view of surrounding objects below the free vision range provided by the slot and associated forwardly projecting tube.

Referring to the drawing, like numerals refer to like parts throughout. In accordance with the preferred form, a pair of spectacle rims 10—10 are provided with diaphragms 11—11 preferably arcuate shaped in section. The major portion 12 of each diaphragm 11 including the upper half thereof is formed from opaque material and provided with a slot 13 in the center of rotation of the eye surrounded by a forwardly projecting tube 14. This major portion 12 is preferably molded from any suitable material such as "bakelite". The height of the slot 13 and the corresponding diameter of the inside of the tube 14 are larger than the normal diameter of the eye, that is from about 5 to 10 millimeters. The lateral length of the slot 13 and the corresponding diameter of the inside of the tube 14 are sufficient to give lateral vision. The forward length of the tube 14 is sufficient to augment the subjective intensity of a viewed object by creating a field stop, for example, from about 5 to 10 millimeters.

The minor portion 15 of the diaphragm below the slot 13 and associated tube 14 is formed from transparent material having glare reducing properties while permitting vision below the range provided by the slot 13 and associated tube 14. In the preferred form depicted in Figs. 1, 2, 3 and 4, the minor transparent portion 15 consists of a tinted transparent sheet material of the type used in the ordinary glare reducing spectacles. As shown in Figs. 2 and 4, the upper edge of the minor portion 15 overlaps the lower edge of the major portion 12 and is secured thereto in any suitable manner for example by adhesive.

In Fig. 5 a modified form is depicted wherein the entire diaphragm 11 is preferably formed from transparent material, for example organic glass preferably tinted to have glare reducing properties. The major portion 12' including the upper half of the diaphragm and the forwardly projecting tube 14 is opaqued by a layer 16 of non-transparent material, for example a non-transparent varnish.

A further modified form is depicted in Figs. 6 and 7 wherein the vision slot 13 is closed by a transparent section 17, as depicted, to prevent the intrusion of dust particles, insects and the like. This modified form may consist of a diaphragm provided with a forwardly projecting tube 14 made integral therewith. The entire surface of the diaphragm including the forwardly projecting tube is opaqued by a layer 16 of non-transparent material.

It will thus be seen that the device of the present invention efficiently attains the objects set forth above. This device can be used to great advantage by audiences of sporting events, theatrical and motion picture performances, etc. By using the described device the wearer is no longer disturbed by side-light effects coming from the sky, the sun or highly illuminated backgrounds, the side-lights being sufficiently screened off. The full sensibility of the eye is thus reserved for the light coming from the objects to be focused, and owing to these improved psychological conditions the sight capacity of the eye is considerably increased. In addition with the modifications depicted in Figs. 1 to 5 inclusive, vision free from glare is permitted of objects below the free range of vision provided by the horizontal slot and forwardly projecting tube associated therewith.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. An eye shield comprising a diaphragm over each eye, each diaphragm being provided with a horizontal slot disposed on the level of the center of rotation of the eye and with a forwardly projecting tube in registry with said slot, the height of the slot and the corresponding diameter of the inside of the tube being larger than the normal diameter of the pupil of the eye and the lateral length of the slot and corresponding diameter of the inside of the tube being sufficient to give lateral vision with the upper and lower inside walls of the tube disposed substantially parallel to each other, the forward length of the tube being sufficient to augment the subjective intensity of a viewed object by creating a field stop, each diaphragm consisting of a major portion and a minor portion, the major portion including the upper half of the diaphragm, the horizontal slot and the forwardly projecting tube associated therewith, with at least the major portion being opaqued to screen out light rays.

2. An eye shield comprising a diaphragm over each eye, each diaphragm being provided with a horizontal slot disposed on the level of the center of rotation of the eye and with a forwardly projecting tube in registry with said slot, the height of the slot and the corresponding diameter of the inside of the tube being larger than the normal diameter of the pupil of the eye and the lateral length of the slot and corresponding diameter of the inside of the tube being sufficient to give lateral vision with the upper and lower inside walls of the tube disposed substantially parallel to each other, the forward length of the tube being sufficient to augment the subjective intensity of a viewed object by creating a field stop, each diaphragm consisting of a major portion and a minor portion, the major portion being opaque and including the upper half of the diaphragm, the horizontal slot and the forwardly projecting tube associated therewith, and the minor portion being transparent.

3. An eye shield comprising a diaphragm over each eye, each diaphragm being provided with a horizontal slot disposed on the level of the center of rotation of the eye and with a forwardly projecting tube in registry with said slot, the height of the slot and the corresponding diameter of the inside of the tube being larger than the normal diameter of the pupil of the eye and the lateral length of the slot and corresponding diameter of the inside of the tube being sufficient to give lateral vision with the upper and lower inside walls of the tube disposed substantially parallel to each other, the forward length of the tube being sufficient to augment the subjective intensity of a viewed object by creating a field stop, each diaphragm consisting of a major portion and a minor portion, the major portion being opaque and including the upper half of the diaphragm, the horizontal slot and the forwardly projecting tube associated therewith, and the minor portion being transparent and having ray filtering properties to reduce glare.

4. An eye shield comprising a diaphragm over each eye, each diaphragm being arcuate shaped in section and consisting of a major opaque portion including the upper half of said diaphragm, and a minor transparent portion having glare reducing properties, said major portion being provided with a horizontal slot disposed on the level of the center of rotation of the eye and with a forwardly projecting tube in registry with said slot, the height of the slot and the corresponding diameter of the inside of the tube being larger than the normal diameter of the pupil of the eye and the lateral length of the slot and corresponding diameter of the inside of the tube being sufficient to give lateral vision with the upper and lower inside walls of the tube disposed substantially parallel to each other, the forward length of the tube being sufficient to augment the subjective intensity of a viewed object by creating a field stop.

5. An eye shield comprising a pair of rims and a pair of diaphragms arcuate shaped in section and mounted in said rims, each diaphragm consisting of an upper section of opaque material constituting the major portion of said diaphragm and a lower section of transparent glare reducing material joined to said upper section, said upper section being provided with a horizontal slot disposed on the level of the center of rotation of the eye and with a forwardly projecting tube in registry with said slot, the height of the slot and the corresponding diameter of the inside of the tube being larger than the normal diameter of the pupil of the eye and the lateral length of the slot and corresponding diameter of the inside of the tube being sufficient to give lateral vision with the upper and lower inside walls of the tube disposed substantially parallel to each other, the forward length of the tube being sufficient to augment the subjective intensity of a viewed object by creating a field stop.

6. An eye shield comprising a diaphragm over each eye, each diaphragm comprising a plate arcuate shaped in section and formed from transparent material, an opaqued forwardly projecting tube disposed on the outer surface of said plate on the level of the center of rotation of the eye, the vertical diameter of the inside of the tube being larger than the normal diameter of the pupil of the eye and the lateral diameter of the inside of the tube being sufficient to give lateral vision with the upper and lower inside walls of the tube disposed substantially parallel to each other, the forward length of the tube being sufficient to augment the subjective intensity of a viewed object by creating a field stop, said plate having the surface thereof beyond the area inside the tube covered with opaque material to screen out light rays.

PETER SCHLUMBOHM.